Figure 1:
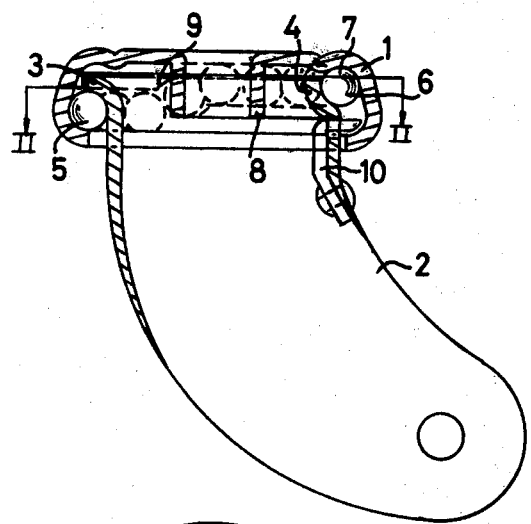

United States Patent

[11] 3,602,941

| [72] | Inventor | Gunnar Erik Werner Lewin<br>Stockholm, Sweden |
|---|---|---|
| [21] | Appl. No. | 17,716 |
| [22] | Filed | Mar. 9, 1970 |
| [45] | Patented | Sept. 7, 1971 |
| [73] | Assignee | A B Lyckeaborgs Bruk, Torskors, Sweden |
| [32] | Priority | Mar. 11, 1969, Dec. 31, 1969 |
| [33] | | Sweden |
| [31] | | 3315 and 18,158 |

[54] CASTER WHEEL ARRANGEMENT
10 Claims, 14 Drawing Figs.

[52] U.S. Cl. .................................................... 16/21
[51] Int. Cl. ................................................ B60b 33/00
[50] Field of Search .......................................... 16/21, 26

[56] References Cited
UNITED STATES PATENTS

| 1,747,319 | 2/1930 | Pribil ............................ | 16/21 |
| 1,930,622 | 10/1933 | Noelting ..................... | 16/21 |

Primary Examiner—Bobby R. Gay
Assistant Examiner—Doris L. Troutman
Attorney—Pierce, Scheffler & Parker ABSTRACT: A caster wheel arrangement in which the caster wheel is rotatably supported by ball bearings mounted in a ball bearing race, at least one portion of which is located at a horizontal level vertically displaced from the horizontal level of the remaining portion or portions of the ball bearing race, all portions of the race being interconnected to form one continuous race.

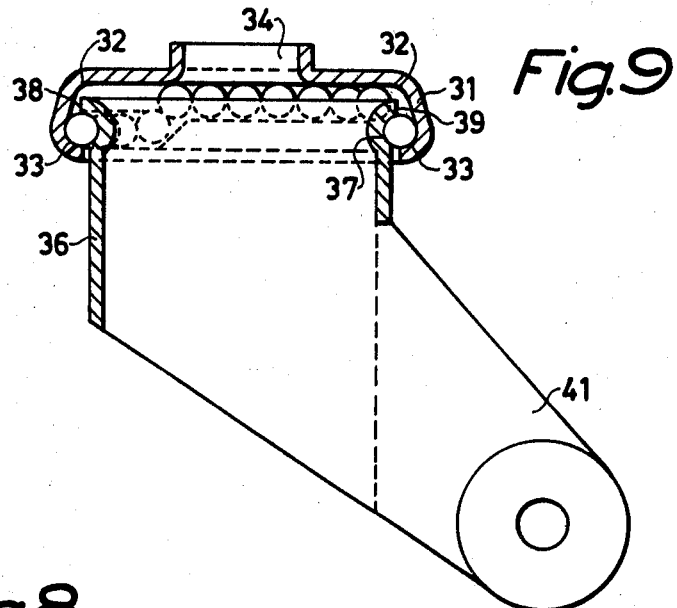
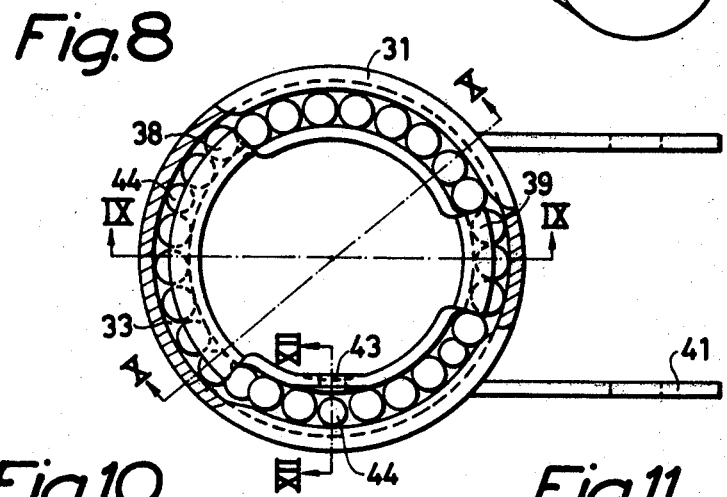
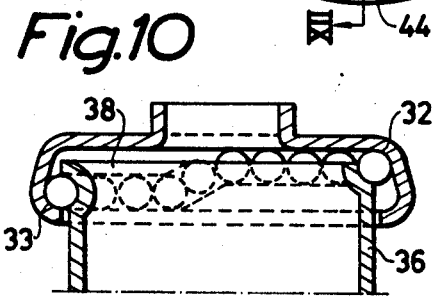
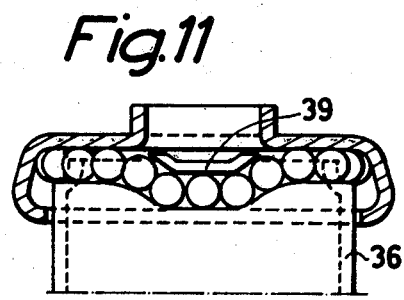

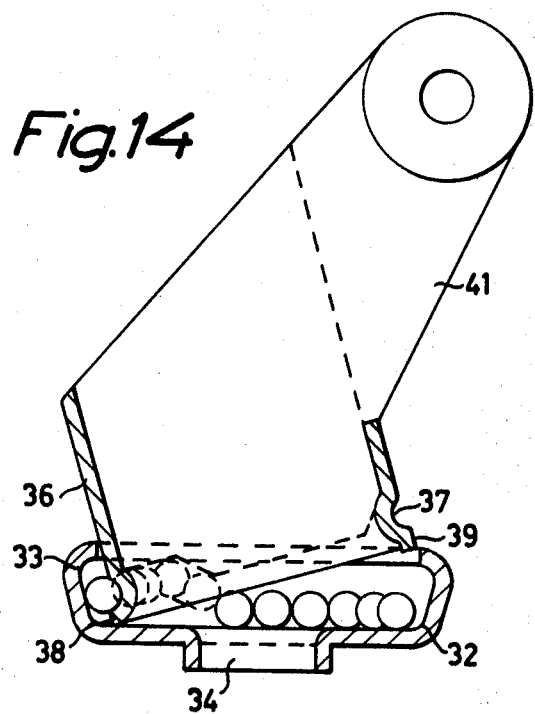
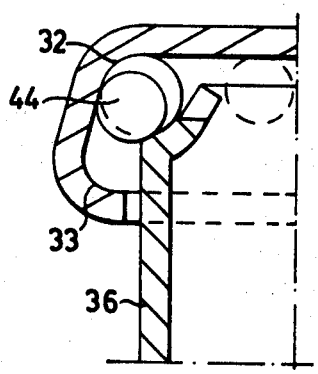
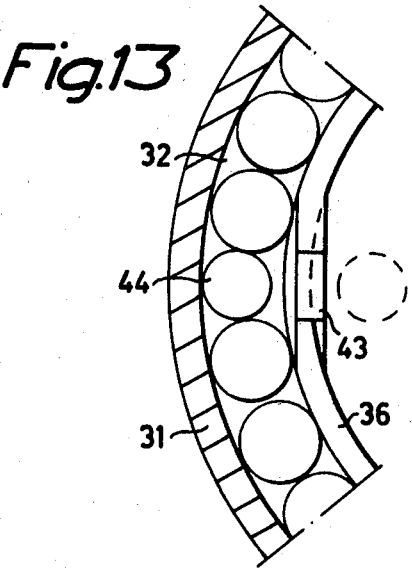

CASTER WHEEL ARRANGEMENT

This invention relates to an arrangement for caster wheels comprising a fork, the upper part of which is pivotally mounted and entirely enclosed in a bearing box.

In conventional caster wheel arrangements those parts of the arrangements which are provided with ball races, are connected by a central rivet and/or a ring of rivets or by pressure welding. Usually one ball ring is placed above the fork and one ball ring in the upper plane of the fork. When the two ball boxes enclosing the fork are being connected by rivets, for example, or by pressure welding, the balls are already located in their respective ball races. Upon compressing the ball boxes the hardened balls often cause marks in the ball races, so that the balls will not roll perfectly in their races. In order to avoid this shortcoming, an intermediate space is normally arranged between the ball boxes which is of such a size, that too great a play can arise which deteriorates the bearing function. In such a case the fork when subjected to load affects only those balls located at the respective outer edges. Pressure welding, moreover, involves the disadvantage of causing marks in the surface layer after heating and the risk of showers of sparks on the balls and ball races. As a further disadvantage there can be mentioned the varying material thickness of the sheet metal used.

In containers provided with sheet metal bottoms, as is usually the case, heretofore caster wheel arrangements with a mounting plate have been used. Said plate is secured to the container bottom by rivets or bolts and requires for this a number of accurately located holes in the bottom. This is expensive as well as time consuming, both during mounting and dismounting.

Irrespective of the type of attachment applied to such caster wheel arrangements, duct and dirt always will penetrate between the respective ball races. Since the parts cannot be detached from one another, there is no possibility of cleaning the caster wheel arrangement.

The present invention which has as its object to eliminate said disadvantages, relates to a caster wheel arrangement comprising a wheel fork having a substantially cylindrical upper portion which is pivotally mounted by means of a ring of balls. The invention is characterized in that the upper portion of the wheel fork is mounted pivotally within a ball box entirely enclosing said upper portion, that the upper edge of the wheel fork remote from the wheel side is provided with a projecting bearing flange, that the opposite upper edge of the wheel fork is provided with a corresponding bearing arrangement, that a group of the balls are arranged in a lower plane between the projecting bearing flange and the bearing box, and another group of the balls are arranged in an upper plane between the second bearing arrangement and the bearing box, the balls being arranged so as to roll between the separated planes through a passageway between the ball races which is located where the balls are subjected to a relatively slight pressure (torque conversion).

According to an embodiment of the invention, a continuous ball race running in two vertically separated planes is impressed into the outer periphery of the cylindric wheel fork, and an additional bearing flange bent horizontally outwardly is formed at the upper edge of the wheel fork directly opposite the first flange, said ball race extending below the bearing flanges in the lower plane and between the bearing flanges in the upper plane.

In a caster wheel arrangement constructed according to the present invention all parts comprised therein can be hardened, surface treated and mounted without subjecting the surface finish to damage. In the accompanying drawings three embodiments of the invention are shown, FIGS. 1, 2, 3 and 4 showing the first embodiment, FIGS. 5–7 showing the second embodiment, and FIGS. 8–14 showing the third embodiment.

Figure 2:
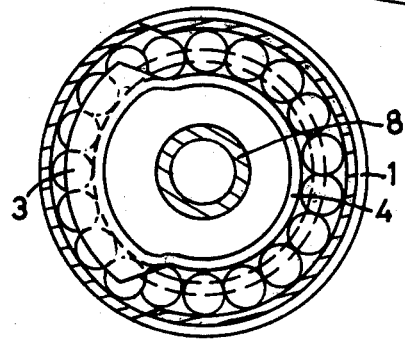
Figure 3:
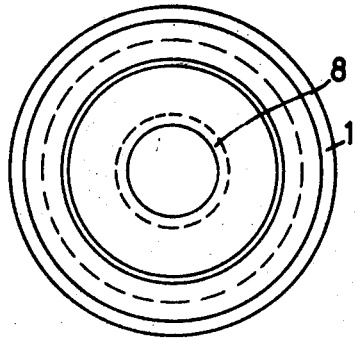
Figure 7:
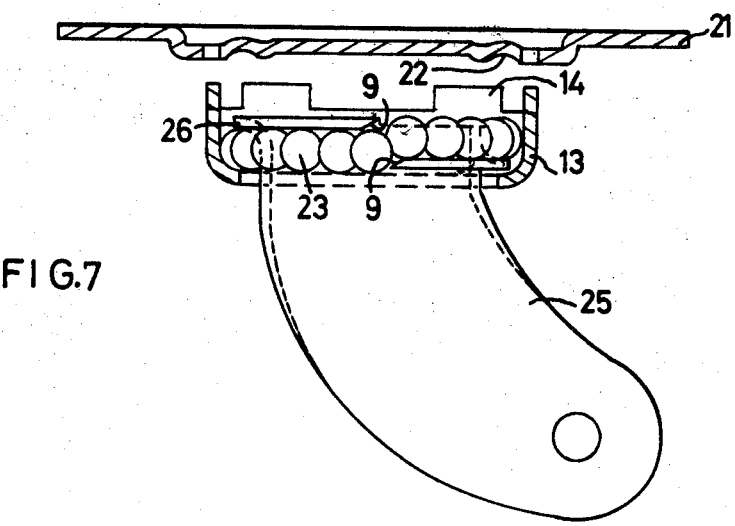
Figure 4:
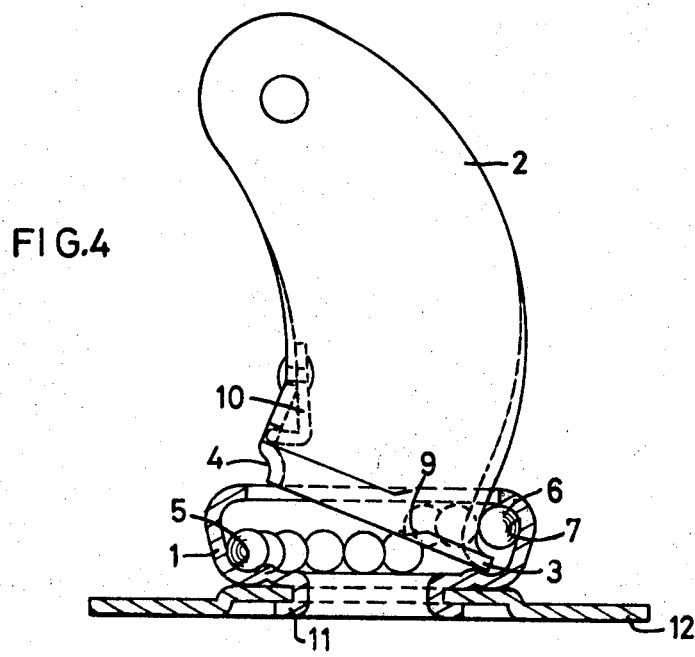
Figure 5:
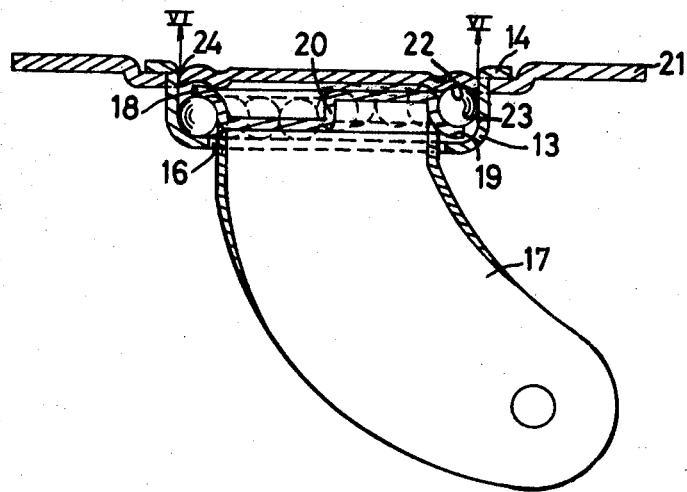
Figure 6:
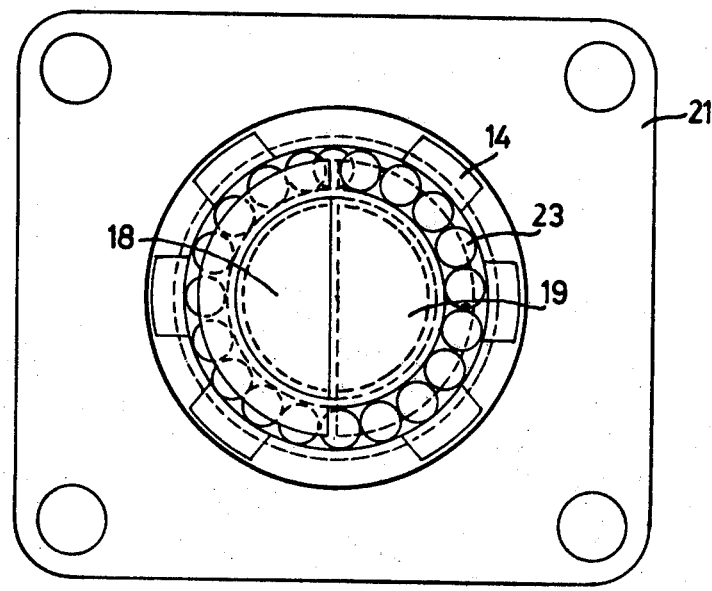

FIG. 1 is a vertical section through an embodiment of the caster wheel arrangement according to the invention, FIG. 2 is a section after the line II—II in FIG. 1, FIG. 3 shows a horizontal plan view of the arrangement according to FIG. 1 seen from above, FIG. 4 shows the mounting of the fork in the bearing box when the bearing box is rigidly mounted in a mounting plate by flanging, FIG. 5 is a vertical section of a second embodiment of the caster wheel arrangement according to the invention, FIG. 6 shows a horizontal plan view of the arrangement according to FIG. 5 seen from above, the mounting plate portion located inside the bearing box being removed, FIG. 7 shows a partially exploded cross section through the arrangement according to FIG. 5, in which balls have been laid into the bearing box and the fork has been introduced ready for being connected to the mounting plate, FIG. 8 shows a horizontal plan view from above of the third embodiment of the invention, the upwardly facing portion of the bearing box being removed to afford of a better view, FIG. 9 is a vertical section through the arrangement along the line IX–IX in FIG. 8, FIG. 10 is a vertical section through the arrangement along the line X—X in FIG. 8, FIG. 11 shows a vertical view of the arrangement according to FIG. 8 seen from the right and illustrating the position of the additional flange, FIG. 12 is a vertical section through part of the arrangement along the line XII—XII in FIG. 8 with the recess for the distance balls, FIG. 13 shows a horizontal plan view from above of the arrangement shown in FIG. 12, FIG. 14 is a vertical section of the caster wheel arrangement during the mounting of the wheel fork in the bearing.

In the embodiment of the invention shown in FIGS. 1–4 the bearing box 1 is turned upside down and provided with an inwardly bent lower flange forming a inner ball race 5. The diameter of the lower edge of the flange slightly exceeds the diameter of the cylindrical upper portion of the wheel fork 2, which cylindric portion is inserted inside said lower flange.

The upper portion of the wheel fork 2, at the edge remote from the wheel side, is provided with an outwardly folded edge flange 3 extending a limited distance along the edge, the lower surface of said edge flange forming a ball race corresponding to the ball race 5 of the bearing box. In the opposite edge of said upper portion of the wheel fork 2 there is impressed a ball race 4 extending around the remaining part of the upper edge and corresponding to an upper ball race 7 formed in the upper portion of the bearing box 1. The ball race 7, 4 is located in a plane higher than but parallel with a plane through the ball race 5,3. A group of balls 6 are arranged in the lower ball race 5,3 and a group of balls 6 are arranged in the upper ball race 7,4, which balls form a continuous ring and are adapted upon pivotal movement of the wheel fork to roll between the separate planes. This ball movement is facilitated in that the ends of the projecting edge flange 3 are bevelled at 9.

The wheel fork 2 can be taken out of its position in the bearing box 1, due to the fact that the distance between the impressed ball race 4 and the outer edge of the projecting edge flange 3 was chosen so that the edge with the ball race 4 upon pivotal movement in a vertical plane from the wheel side and back does not come into contact with the opening of the bearing box. By this construction the forces which act upwardly against the caster wheel and which are the greatest forces, are taken up by the balls both in the lower and in the upper ball group. The bearing box 1 entirely encloses the upper portion of the wheel fork inclusive of the swivel bearing, so that said bearing is to a large extent protected against dust and impurities, and at the same time the arrangement can be easily taken apart and cleaned, if needed. The upwardly facing portion of the bearing box 1 can be provided with a central bore having a downwardly directed collar 8 (see FIG. 1) or an upwardly directed collar 11 (see FIG. 4). If the bearing box is provided with a bore having a downwardly directed collar 8, said collar is intended for a mounting pin, for example for mounting on a tubular leg or the like. The wheel fork 2 may be provided with a snap catch 10 as shown in FIGS. 1 and 4 on the wheel side of the fork for locking the wheel fork in the bearing box 1.

A bearing box 1 provided with an upwardly directed collar 11 is adapted to be mounted in a corresponding bore in a container bottom or a mounting plate 12.

The upwardly directed portion of the bearing box 1 may be provided with a central bore having a downwardly directed collar 8 intended for a mounting pin or a tubular leg on a carriage or the like, in which latter case the usual pin connection is eliminated.

The central portion of the bearing box, however, instead of being provided with a downwardly directed collar may have an upwardly directed collar 11 which is adapted to be inserted through a corresponding bore in the mounting plate 12 or in a container bottom, in which latter case the connection via a mounting plate is eliminated. In FIGS. 5–7 another embodiment of the invention is shown, comprising a bearing box 13 provided along its upwardly directed upper edge with upwardly projecting tongues 14, by which the box can be secured in slots 24 in a mounting plate 21 or in a container bottom. The bearing box bottom includes a circular central bore 16 through which the substantially cylindrical upper portion of a wheel fork 17 is inserted. The wheel fork 17 has rigidly mounted to its upper portion a bearing plate provided with flanges, which comprise two semicircular parts 18 and 19 each located in its own plane and connected with one another by a diametrically opposed crossover channel 20. The flange 19 of the upper plate half projects downwardly and outwardly at 19 substantially in the form of an arc, so that its upper surface forms the lower portion of a ball race. The flange 18 of the lower plate half which is of corresponding shape, projects upwardly and outwardly and forms the upper portion of a ball race.

Between the flange 19 and a ball race 22 provided in the mounting plate 21, a group of balls 23 are mounted, and between the flange 18 and the lower inwardly turned flange of the bearing box, 13 a second group of balls 23 are arranged to roll. The distance between the ends of the bearing plate flanges 18 and 19 is such that the balls 23 can pass freely from one ball race to the other. In order to facilitate said passage, the end edges of the flanges are bevelled at 9 and the diametric crossmember of the bearing plate extends only to the ball race. The upper portion of the wheel fork 17 preferably is secured to the bearing plate by pressure welding. In a caster wheel arrangement of this construction, the upwardly directed forces which act on the wheel fork and which may be substantial, are taken up by the balls both above the flange 19 and below the flange 18. The downwardly directed forces, which are small, are not carried directly by either ball group.

The bearing box instead of being mounted on a special mounting plate 21 may be mounted directly on a container bottom, in which case the slots for the tongues 14 are punched out, and a ball race corresponding to the ball race 22 is impressed into the container bottom, preferably during the manufacture of the container. Thereby, the mounting of a caster wheel arrangement of such construction is relatively simple and can be carried out quickly without requiring rivets or bolts, thereby rendering substantial savings in cost.

FIGS. 8–14 show the third embodiment of the invention, which comprises a conical bearing box 31 turned upside down in which a wheel fork 36 is pivotally mounted, the legs 41 of which project obliquely downwardly from a cylindrical upper portion 36. The bearing box 31 has a substantially plane upwardly facing portion in the center of which is provided a bore with upwardly directed cylindrical collar 34 for connecting the caster wheel arrangement to an object to be supported. The bearing box 31 has a conical outwardly directed sidewall, the downwardly facing edge being bent inwardly and forming a flange for a lower ball race 33 in the bearing box. An upper ball race 32 is provided in the bearing box at the transition between its upwardly facing portion and the conical sidewall. Into the outer surface of the portion 36 of the wheel fork a ball race 37 is provided which extends in two vertically separate planes having oblique transition races between the planes. A portion of the ball race 37 around the upper portion 36 includes a horizontally projecting edge flange 38, and on the opposite side of the cylindrical portion a second horizontally projecting edge flange 39. The ball race 37 extends in its lower plane below said edge flanges and up to its upper plane between the edge flanges, said transition races being located substantially at the torque converting position for the bending forces acting on the wheel fork. Thereby the load on the balls in the transition races is substantially insignificant and does not affect the ball movement.

The first mentioned edge flange 38 is provided on that side of the cylindrical fork upper portion which is opposed to the fork legs 41, and it exceeds in length the opposed edge flange 39 provided on the same side as the fork legs. The two edge flanges are adapted resiliently to take up the vertical forces acting on corresponding parts of the wheel fork, and the edge flange 39 in addition has as its object to retain the cylindrical portion in its position in the bearing box even when the caster wheel arrangement is lifted or subjected to impact forces in the opposite direction.

In order to fill the ball race 37 with as many balls as possible, the last balls are pressed into the race between the edges of the bearing box and the wheel fork when the wheel fork is being mounted in the bearing box 31. This is possible due to the fact that the bearing box and wheel fork are made of pressed sheet metal with a certain degree of resilience. There remains, however, normally a slightly too wide space between the balls in the ball race 37 even after the last ball which could be pressed into the race has been positioned. In order to be able to fill the ball race substantially entirely with balls, a U-shaped recess 43 is made in the ball race in the upper edge of the cylindrical fork portion 36. Said recess 43 is smaller than the diameter of the normal balls and is especially intended for smaller so-called distance balls 44 to fill in the space in between the normal balls.

Owing to their smaller size, the distance balls 44 are held down by the larger normal balls and thereby are prevented from leaving the ball race 37 through the recess 43. The recess 43 is placed at the torque conversion point between the forces acting on the wheel fork, i.e. where the load is smallest. The weakening of the ball race, therefore, is practically of no importance.

When the ball race by these measures is filled entirely with balls, the upper portion 36 of the wheel fork cannot move appreciably in an axial direction and, thus, it cannot leave its position in the bearing box when the caster wheel arrangement is lifted. Hereby the snap catch 10 according to the foregoing embodiments can be eliminated, which renders the manufacture simpler and cheaper.

I claim:

1. A caster wheel arrangement comprising a wheel fork having a substantially cylindrical upper portion a bearing box having a central opening in the bottom thereof bounded by an inwardly turned flange, said cylindrical upper portion being pivotally mounted in the central opening of said bearing box and being enclosed thereby, the upper edge of said wheel fork remote from the wheel side being provided with a projecting bearing flange to form a lower ball bearing race with the inwardly turned flange of said bearing box, at least one portion of the remainder of the upper edge of said wheel fork being provided with bearing means to form an upper ball bearing race with the upper circumference of said bearing box, said ball bearing races being interconnected, and a plurality of ball bearings disposed in said upper and lower ball bearing races, the diametric distance between the upper edge of said bearing means and the outer edge of the projecting flange being such that the wheel fork can be removed from its position in the bearing box.

2. A caster wheel arrangement as claimed in claim 1 and further comprising snap means provided on the wheel side of the wheel fork for engagement with the bearing box to prevent pivotal movement of the wheel fork in the bearing box.

3. A caster wheel arrangement as claimed in claim 1 wherein the bearing box is provided with a central downwardly turned collar in its upper surface to form a central bore therein.

4. A caster wheel arrangement as claimed in claim 1 wherein the bearing box is provided with a central upwardly turned collar in its upper surface for attaching the caster wheel to a mounting plate or container bottom.

5. A caster wheel arrangement as claimed in claim 1 wherein the bearing box is provided at the top thereof with a plurality of circumferentially arranged tongues projecting from the top of said box for attachment to a mounting plate or container bottom, a circular bearing plate disposed across the top of the cylindrical upper portion of the wheel fork, said plate having a diametrical step thereacross to provide an upper semicircular portion and a lower semicircular portion, the edge of said lower portion being provided with a projecting bearing flange to form a part of the lower ball bearing race and the edge of the upper portion being provided with bearing means to form a part of the upper ball bearing race.

6. A caster wheel arrangement as claimed in claim 5 and further comprising a mounting plate for receiving said projecting tongues and for enclosing the upper part of said bearing box, said mounting plate being provided with a ball bearing race impressed in the lower surface thereof for forming a part of the upper ball bearing race with the bearing means formed in the edge of the upper semicircular portion of the circular bearing plate.

7. A caster wheel arrangement as claimed in claim 5 wherein the ends of the edges of the upper and lower semicircular portions of the circular bearing plate are bevelled to provide a passage for permitting the ball bearings to pass from one ball bearing race to the other.

8. A caster wheel arrangement as claimed in claim 1 wherein the upper edge of the wheel fork is provided with a second projecting bearing flange substantially diametrically opposite to the projecting bearing flange remote from the wheel side so as to provide two upper ball bearing races alternating between the two lower ball bearing races, said lower races being below the projecting flanges and the upper races between the ends of the projecting flanges.

9. A caster wheel arrangement as claimed in claim 20 wherein one of the projecting bearing flanges has a greater length than the opposite projecting bearing flange and that both projecting bearing flanges are arranged symmetrically with respect to a common axis.

10. A caster wheel arrangement as claimed in claim 9 wherein the longer projecting bearing flange is located on the side of the fork wheel remote from the wheel side.

UNITED STATES PATENT OFFICE
CERTIFICATE OF CORRECTION

Patent No. 3,602,941            Dated September 7, 1971

Inventor(x) GUNNAR ERIK WERNER LEWIN

It is certified that error appears in the above-identified patent and that said Letters Patent are hereby corrected as shown below:

Claim 9 - line 1 -- change the numeral "20" to -- 8 --

Signed and sealed this 18th day of January 1972.

(SEAL)
Attest:

EDWARD M. FLETCHER, JR.          ROBERT GOTTSCHALK
Attesting Officer                Acting Commissioner of Patents